Oct. 28, 1947.   G. W. EYPPER   2,429,675
CORD ADJUSTING AND STORAGE REEL
Filed July 18, 1945

INVENTOR.
George H. Eypper
BY
James G. Bethell

Patented Oct. 28, 1947

2,429,675

UNITED STATES PATENT OFFICE 2,429,675

CORD ADJUSTING AND STORAGE REEL

George W. Eypper, Montclair, N. J.

Application July 18, 1945, Serial No. 605,748

4 Claims. (Cl. 242—97)

This invention relates to an improvement in reels for electric cords and wires, hereinafter referred to as cords, and has for one of its objects to provide a reel which is not only adapted for use in industry but for domestic use as well, the reel being small and compact for its capacity, and of simple construction and operation so that it is readily operated by anyone.

More specifically my invention provides a reel for electric cords by which the length of the cord is readily varied, excess cord being completely concealed within the reel. The cord is lengthened by simply pulling upon the two ends of the same in opposite directions, and is shortened by merely rotating one section of the reel relatively to the other.

It will be appreciated from the brief outline so far given that my device is extremely useful in industry to avoid accidents to personnel and injury to equipment, in that it provides a safe, compact case for all excess lengths of cord by which the excess is kept out of the way, yet made instantly available.

It will be appreciated also that my device is useful in the home, particularly in apartments, where space is always limited. In such use it prevents the cords of toasters, grills, percolators and other domestic electrical appliances from becoming entangled; provides for the storage of the cord in a small space when not in use; and when employed on lamp cords, it takes care of excess cordage when the lamp is near an outlet, and yet enables the lamp readily to be moved away from the outlet for the full length or reach of the cord.

In the accompanying drawings wherein I have illustrated an embodiment of my invention, Fig. 1 shows my device in perspective;

Figure 1:
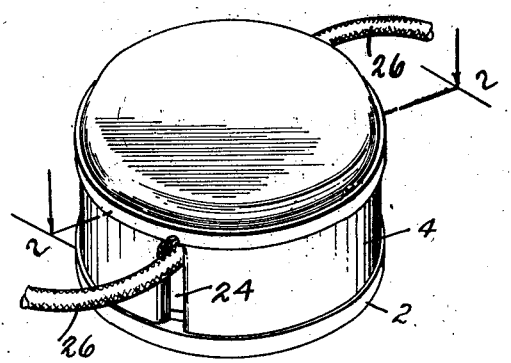
Figure 2:
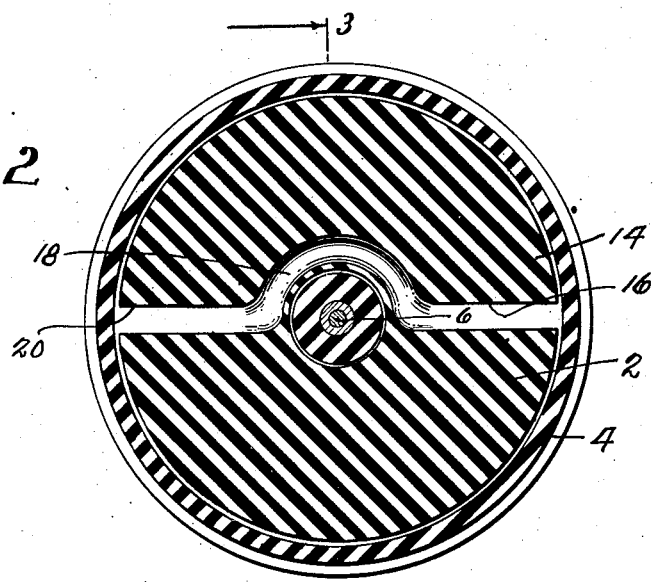
Fig. 2 is an enlarged section on line 2—2 of Fig. 1.
Figure 3:
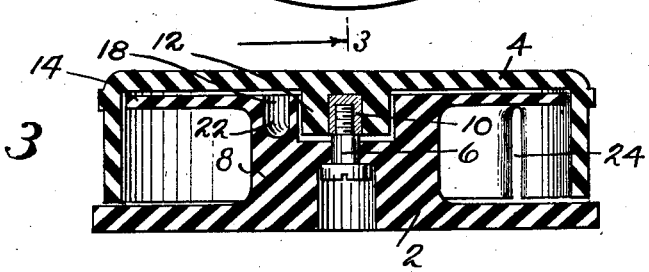
Fig. 3 is a section on the line 3—3 of Fig. 2.

Referring to the drawings in detail, 2 designates the reel section and 4 the cover section of my improved cord take-up and storage reel.

These members are composed of any suitable non-metallic electrically insulating material. Hard rubber is an example of a usable material, but I prefer a material available on the market and composed of cloth impregnated usually with a thermo setting material such as the phenolic condensation product known commercially as Bakelite.

The cover 4 is cup-shaped and is nested with the reel member 2 so that the cord which is wrapped about the reel as will be explained presently, is completely enclosed except for its two ends. I prefer to make the device round in plan, and the reel member functions as the base for resting upon the floor or table. The outside diameter of the assembly is somewhat greater than the height to avoid upsetting.

The reel member 2 and cover 4 are held to each other by screw 6 which passes freely through the drum 8 of the reel member and is screwed into an insert 10 set in lug 12 formed in the inner face of cover member 4. This arrangement permits the two members 2 and 4 to be rotated relatively to each other.

The upper flange of the reel member is designated 14 and is provided with a cord-receiving slot 16. This slot, which is formed completely through the flange, extends inwardly from the periphery of the flange to adjacent the lug 12, curving around this lug as seen at 18 and then outwardly as seen at 20 to the opposite edge of the flange. For part of its length the cord-receiving slot overlies the reel drum 8, and throughout this distance the drum is slotted to about midway of its depth as seen at 22.

The cover member 4 is provided in its side walls with two slots 24 which are open at their lower ends but terminate short of the top or roof of the cover.

In use it is merely necessary to separate the members 2 and 4 by removing the screw 6. The cord 26 is then laid in the groove 16 and pushed downwardly into the drum groove 22. Preferably, though not necessarily, the reel member is placed about midway of the cord. The reel member and cover are then assembled, the grooves 24 in the cover receiving the cord, and permitting the cover to nest fully with the reel member. After the screw 6 has been screwed in position, the two members 2 and 4 are rotated simply by holding one member in the hand and turning the other.

By reason of the fact that the cord 26 lies in the groove in the reel member and projects from the reel member at opposite sides thereof, and by reason of the fact that the free ends of the cord pass out through the cover at opposite sides of the device, it will be appreciated that as the cover and reel are rotated relatively in one direction, the cord will be deflected in one direction, while the cord at the other side of the reel is deflected oppositely so that the cord will be wound upon the drum at opposite sides of the drum simultaneously to shorten the cord at each side of the device and because of the arrangement just referred to, but a very few turns are necessary to take up the entire cord.

In lengthening the cord the two members 2 and 4 may be rotated in the opposite direction, but the simplest procedure is to pull on the two protruding ends of the cord which of course will cause the reel member 2 to rotate.

It is to be understood that all slot edges are rounded off to reduce friction and to eliminate as much as possible chafing of the cord insulation.

It is to be understood that changes may be made in the details of construction and arrangement of parts hereinabove described within the purview of my invention.

What I claim is:

1. An article of the class described comprising in combination a cord-storage reel having a drum and a flange, a cover member for receiving and housing said reel, means for attaching the two members to each other for relative rotation, said flange being provided with a cord-receiving slot extending completely across the flange and through the same into said drum, the side walls of the cover member being provided with spaced slots for receiving the projecting portion of a cord lying in the slot in the reel flange, whereby relative rotation of the reel and cover members will cause the cord projecting through the cover slot from one end of the reel slot to be deflected around the reel drum in one direction, and that portion of the cord projecting through the other cover slot from the opposite end of the reel slot to be deflected around the reel drum in the opposite direction, thereby to coil the cord about the reel drum at opposite sides of the drum simultaneously.

2. An article of manufacture of the class described comprising in combination a cord-storage reel having a drum and a flange, a cover member for receiving and housing said reel, means for attaching the two members to each other for free relative rotation, said flange being provided with a cord-receiving slot extending from one edge of the flange to a point diametrically opposite at the other side of the flange, the slot being curved intermediate its ends to one side of the axis of rotation of the drum and cover, said slot extending completely through the flange and into said drum, the side walls of said cover being slotted at diametrically opposite points in the cover side walls, said cover slots receiving the portions of the cord projecting from the ends of the first mentioned slots, whereby relative rotation of the reel and cover will draw the cord into the cover and coil the same upon the reel drum at both sides of the reel drum simultaneously.

3. An article of manufacture of the class described comprising in combination a cord-storage reel of electrical insulating material and comprising a drum and a flange, a housing cover of insulating material for receiving and housing the reel, means for attaching the two members to each other for relative rotation, the reel flange being provided with a cord-receiving slot passing entirely through the flange and into said reel drum and extending transversely of the flange from one edge thereof to the opposite edge, the side walls of the said cover being provided with slots open at their outer ends and so disposed relatively to each other and to the first mentioned slot that the cover may be superimposed upon the reel and the slots in the cover will receive the projecting portions of a cord lying in the slot in the reel and projecting from the opposite ends thereof, whereby relative rotation of the cover and reel will draw the projecting portions of the cord simultaneously into the cover and wind the same on the reel drum.

4. An article of the class described comprising in combination a cord-storage reel, a cover member for receiving and housing the reel, means for attaching the reel and cover to each other for relative rotation, the drum of the reel being provided with a cord-receiving curvilinear slot extending completely across the drum and curving to one side of the axis of rotation of the reel, the side walls of the cover member being provided with spaced slots for the reception of the two projecting portions of a cord lying in the slot in the reel, whereby, upon relative rotation of the reel and cover member, the two projecting portions of the cord will be drawn into the device and wrapped about the said drum simultaneously.

GEORGE W. EYPPER.

REFERENCES CITED

The following references are of record in the file of this patent:

UNITED STATES PATENTS

| Number | Name | Date |
|---|---|---|
| 944,786 | Hinds | Dec. 28, 1909 |
| 1,186,131 | Replogle | June 6, 1916 |
| 1,692,517 | Replogle | Nov. 20, 1928 |